(12) United States Patent
Meyer

(10) Patent No.: US 10,330,820 B2
(45) Date of Patent: Jun. 25, 2019

(54) SYSTEM AND METHOD FOR GRAVIMETRY WITHOUT USE OF AN INERTIAL REFERENCE

(71) Applicant: Lockheed Martin Corporation, Bethesda, MD (US)

(72) Inventor: Thomas J. Meyer, Corfu, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1127 days.

(21) Appl. No.: 14/454,468

(22) Filed: Aug. 7, 2014

(65) Prior Publication Data

US 2016/0041300 A1    Feb. 11, 2016

(51) Int. Cl.
*G01V 7/02* (2006.01)
*G01V 7/16* (2006.01)

(52) U.S. Cl.
CPC . *G01V 7/02* (2013.01); *G01V 7/16* (2013.01)

(58) Field of Classification Search
CPC .................................. G01V 7/02; G01V 7/16
See application file for complete search history.

(56) References Cited

U.S. PATENT DOCUMENTS

| | | | |
|---|---|---|---|
| 3,926,054 A * | 12/1975 | Buck | G01V 7/12 73/382 R |
| 5,734,104 A | 3/1998 | Panenka | |
| 5,912,643 A * | 6/1999 | Chew | G01C 21/16 342/457 |
| 2002/0092350 A1 * | 7/2002 | Etkin | G01V 7/16 73/382 G |
| 2004/0073369 A1 | 4/2004 | McElhinney | |

(Continued)

FOREIGN PATENT DOCUMENTS

GB    2489230 A    9/2012

OTHER PUBLICATIONS

International Preliminary Report on Patentability for International Patent Application No. PCT/US2015/044358, dated Feb. 16, 2017, 7 pages.

(Continued)

*Primary Examiner* — Stephanie E Bloss
*Assistant Examiner* — Lisa E Peters
(74) *Attorney, Agent, or Firm* — Withrow & Terranova, PLLC

(57) ABSTRACT

A gravimeter for measuring the gravitational field of the Earth without an inertial reference comprises accelerometer pairs disposed on a platform where the sensitive axis of each accelerometer is arranged on the platform to measure plumb gravity. At least one accelerometer pair is spatially configured to define a baseline therebetween. The gravimeter is positioned so that the baseline is maintained parallel to a linear survey path. Each accelerometer outputs a signal representative of the sum total of the accelerations detected, including accelerations due to gravity and kinematic accelerations of the host vehicle and mounting structure. A processor subtracts the accelerometer pair outputs for common-mode rejection determination of a down gravity gradient and combines with a direct plumb gravity measurement to obtain an enhanced gravity data output that is not subject to frequency limits attributed to the performance limitations of inertial reference devices.

19 Claims, 10 Drawing Sheets

(56) References Cited

U.S. PATENT DOCUMENTS

| | | |
|---|---|---|
| 2004/0149036 A1 | 8/2004 | Foxlin et al. |
| 2005/0268476 A1 | 12/2005 | Illfelder |
| 2006/0156810 A1* | 7/2006 | Brett ................. G01P 1/023 |
| | | 73/382 G |
| 2009/0044621 A1 | 2/2009 | Brett et al. |
| 2009/0064778 A1 | 3/2009 | Metzger et al. |
| 2010/0064767 A1 | 3/2010 | Rice et al. |
| 2011/0175604 A1* | 7/2011 | Polzer ............... G01R 33/022 |
| | | 324/246 |
| 2011/0211423 A1 | 9/2011 | Muyzert et al. |
| 2012/0010817 A1* | 1/2012 | Mann ................. G01V 7/16 |
| | | 702/6 |
| 2013/0031975 A1* | 2/2013 | Moir ................. G01V 7/16 |
| | | 73/382 R |
| 2014/0000362 A1 | 1/2014 | DiStasio et al. |
| 2014/0081595 A1 | 3/2014 | White et al. |
| 2016/0363689 A1* | 12/2016 | Meyer ................. G01V 7/08 |

OTHER PUBLICATIONS

International Search Report and Written Opinion for International Patent Application No. PCT/US2015/044358, dated Nov. 20, 2015, 10 pages.

Extended European Search Report for European Patent Application No. 15829892.7, dated Feb. 12, 2018, 11 pages.

* cited by examiner

US 10,330,820 B2

SYSTEM AND METHOD FOR GRAVIMETRY WITHOUT USE OF AN INERTIAL REFERENCE

FIELD OF THE INVENTION

This application relates to the measurement of gravitational fields using gravimeters.

BACKGROUND OF THE INVENTION

State of the art or conventional gravimeter systems are designed to operate with performance characteristics limited by the accuracy of an inertial reference system such as GPS-derived kinematic acceleration compensation. Such limitation has been accepted for decades. Furthermore, state of the art systems are designed with the goal of performing up to the GPS or inertial reference limit rather than attempting to exceed this limit. Gravimetry solutions that overcome the limitations of GPS or other inertial reference derived kinematic acceleration compensation are desired.

SUMMARY

There is disclosed a system including a gravimeter for measuring the gravitational field of the Earth without an inertial reference. The system comprises a platform having an upper surface on which is disposed at least one pair of accelerometers. The sensitive axis of each accelerometer of the at least one pair of accelerometers is arranged on the platform to measure plumb gravity. A first pair of accelerometers is spatially configured to define a baseline between the accelerometers. During a survey, the gravimeter device is positioned so that the baseline is maintained parallel to a linear survey path. Each accelerometer of the accelerometer pair outputs a signal representative of the sum total of the accelerations detected by the accelerometer. These accelerations include accelerations due to gravity as well as kinematic accelerations of the host vehicle and mounting structure. The signals output by accelerometers are transmitted to a processor for further processing.

The processor may be configured to perform arithmetic operations on the received output signals. For example, the output signal measurement of a first accelerometer in the pair may be subtracted from the output signal measurement of the second accelerometer in the pair. When the direct output measurement values from each accelerometer of the pair are subtracted from each other, accelerations that are experienced equally by both accelerometers in the pair are common-mode rejected from the resulting measurement value. The platform of the gravimeter device provides an environment in which each accelerometer of an accelerometer pair supported on the platform is exposed to the same common plumb gravity.

The gravimeter device is mounted to a host vehicle which carries the gravimeter device during the survey. Kinematic accelerations of the host vehicle are transmitted via the mounting device to the accelerometers of the gravimeter device. The accelerometers in the accelerometer pair share a common mounting device. Therefore, the kinematic accelerations experienced by each accelerometer are effectively the same. When the processor subtracts the output signal measurement values from the two accelerometers in the pair, the common kinematic and plumb gravity acceleration components of the output signals are common-mode rejected in the resulting output value. Once common plumb gravity and kinematic accelerations are removed from the accelerometer outputs, the value remaining represents the difference in plumb gravity anomalies as measured at the locations of the first and second accelerometers in the pair. This difference in the anomaly values may be divided by the distance defined by the baseline between the accelerometers to calculate a forward-down gravity gradient. The horizontal-down gravity gradient, which in one embodiment is represented as the forward-down gradient, is then fused or combined with a value representing plumb gravity based on the accelerometer pair measurements to obtain an enhanced gravity data product. This enhanced gravity data is compensated for kinematic accelerations without the use of an inertial reference device, such as GPS, Doppler velocity logs, or depth sensors. The enhanced gravity data is not subject to frequency limits attributed to the performance limitations of inertial reference devices.

The processor may be further configured to apply a first weighting factor to the horizontal-down gradient and apply a second weighting factor to the direct plumb gravity measurement. The weights are related to estimated frequencies of the error signals, wherein the horizontal or lateral down gravity gradient dominates at higher frequencies (shorter wavelengths) and plumb gravity dominates at lower frequencies (longer wavelengths).

There is also disclosed a method of measuring a gravitational field with a gravimeter device without an inertial reference. The method includes defining a linear survey path, wherein a disk-like platform having an upper surface supports at least one pair of accelerometers positioned and configured to measure plumb gravity. The spatial distance between each accelerometer in the pair defines a baseline. During the survey, the platform is maintained such that the baseline of at least one pair of accelerometers is parallel to the linear survey path. A plumb gravity measurement is obtained from the first accelerometer and the second accelerometer of a pair. The measurements are provided to a processor. The processor performs arithmetic operations on the measured values (e.g. subtraction). More particularly, the first accelerometer plumb gravity measurement is subtracted from the other accelerometer plumb gravity measurement. The subtraction of the measurements causes common plumb gravity and kinematic accelerations to be common-mode rejected out of the resulting measurement. The remaining measurement represents the difference in plumb gravity anomalies measured at each accelerometer in the pair. The difference between the anomalies is divided by the baseline distance between the accelerometers to calculate a horizontal down gravity gradient. The horizontal down gravity gradient represents the change in plumb gravity, due to anomalies occurring at a position of the first accelerometer as compared to a position of the second accelerometer in the pair. The calculated horizontal down gradient is integrated along the survey path by determining the differential gravity anomaly at points along the survey path. The integrated down gradient value for a given position along the survey path is then fused with a direct plumb gravity measurement based on the accelerometer pair outputs to calculate an enhanced plumb gravity data product.

DETAILED DESCRIPTION

Figure 1:
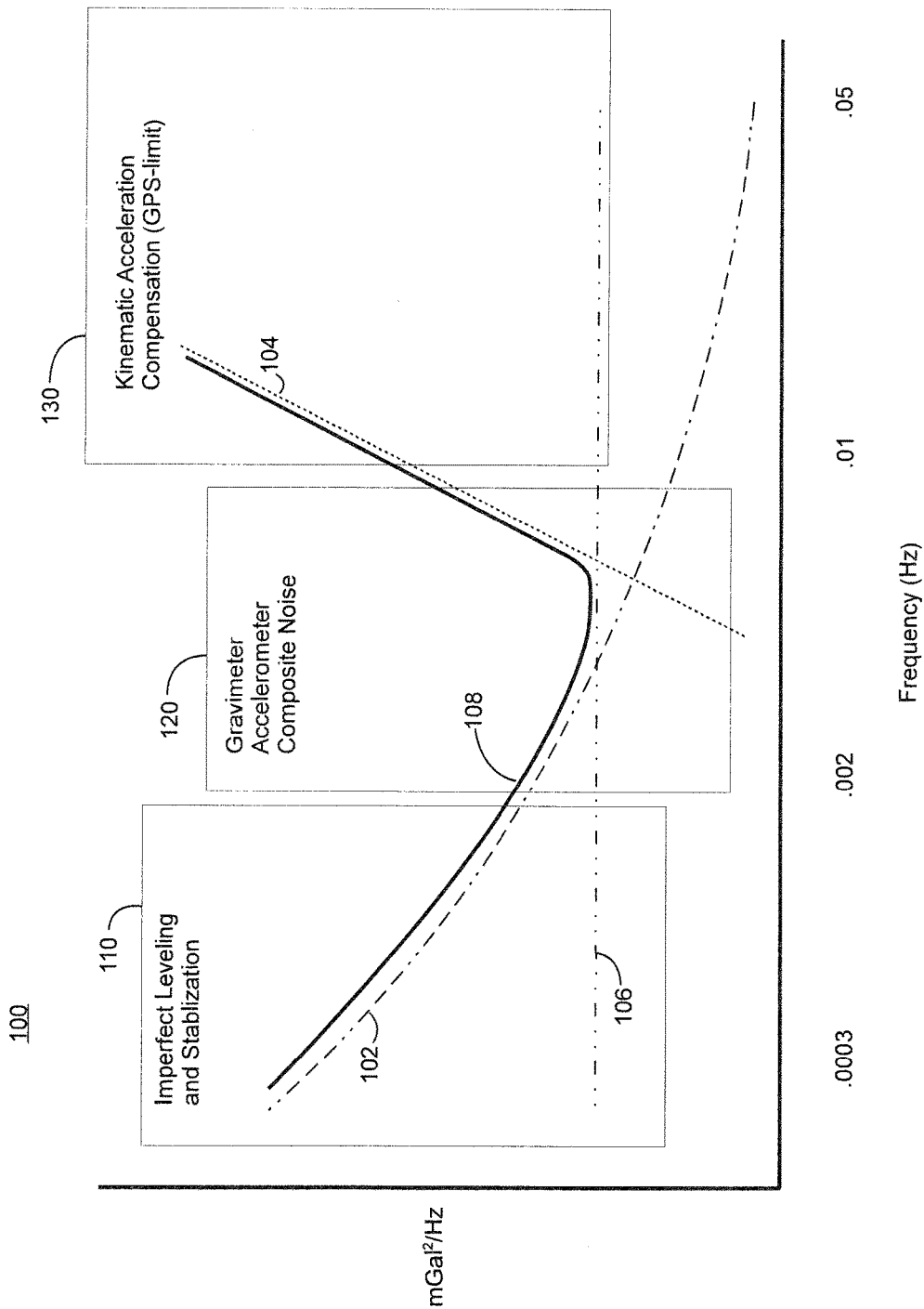
FIG. 1 is a graphical depiction of the limits for compensating the overall error level in a gravimeter device based on state of the art inertial reference compensation limits.

Referring to FIG. 1, there is shown a spectral density graph 100 containing a series of curves 102, 104, and 106 which broadly characterize spectral density and gravimetry errors for gimbal mount systems. Gimbal mount systems attach the gravimeter to a vehicle. Imperfections in mount platform alignment contribute to motion which cross couples into the output of the gravimeter device. This type of interference or noise attributable to the mount tends to dominate at lower frequencies. In FIG. 1, the platform misalignment errors are shown as curve 102. This curve 102 closely tracks the overall gravimeter error shown as curve 108 in the lower frequency region 110. Additionally, accelerometers used in the gravimeter device contribute an internal composite noise component shown as curve 106. Curve 106 dominates the overall error correction limit at intermediate frequencies, as shown in region 120 of FIG. 1. The curve representing overall errors 108 is tracked by the accelerometer composite errors 106 in the intermediate region 120. In higher frequency ranges, such as those in region 130 of FIG. 1, overall gravimeter errors 108 are dominated by kinematic accelerations caused by the relative motion of the host vehicle. For example, in an airplane-based gravimeter, the aircraft carrying the gravimeter device may experience motion laterally in addition to variations in altitude due to turbulence or pilot navigation. These motions result in forces which are applied to the accelerometers. The accelerometers output a signal which represents the value of the sum total of all forces of acceleration including forces related to gravitational accelerations and forces created by the kinematic accelerations of the host vehicle. These kinematic accelerations cannot be separated from the gravitational accelerations in the accelerometer output as explained by Einstein's Equivalence Principle which states that the inertial mass is equivalent to gravitational mass. These kinematic acceleration components are not separated (e.g. not-identifiable) in the accelerometer output.

In conventional error compensation techniques, an inertial reference is used to estimate the kinematic accelerations and to subtract the estimated kinematic accelerations from the direct accelerometer outputs. However, inertial reference devices exhibit limitations in estimating the kinematic accelerations, thereby resulting in residual errors as indicated by curve 104. These residual inertial errors dominate and limit the overall gravimeter errors 108 in the higher frequency range indicated by range 130. As may be seen, as frequency increases, inertial residual errors increase rapidly producing a frequency limit over which inertial references cannot provide further compensation of the gravimeter output for kinematic acceleration.

The overall gravimeter errors 108 may be compensated for by attempting to control the overall gravimeter errors 108 by shifting the error correction limits defined by curves 102, 104 and 106. However, there is diminished return in attempting to effect changes to the curve 102 representing platform alignment errors. This is because only minor, incremental, improvements to platform alignment may be effected, Thus, the potential resultant gains are costly in terms of expense and system complexity. Furthermore, attempts to control platform alignment may further result in undesirable increases in size and weight. Considering the associated improvement in data quality is likewise only incremental and limited to relatively long wavelengths, the benefits derived from trying to manage curve 102 is limited. In contrast, there is a significant potential in effecting changes to the curve 104, representing the kinematic acceleration, for example by sliding curve 104 to a higher frequency (i.e. toward the right with respect to FIG. 1), or removing it altogether.

Performance of state of the art gravimeter systems approaches the bounding curve 104, or so-called "GPS limit" (e.g. for airborne systems) or similar hardware limits applied to other devices (e.g. Doppler velocity logs or depth sensors for underwater systems). These limits are particularly relevant for frequencies at the high end (e.g. up to roughly 0.05 Hz depending on the amount of filtering applied). With respect to GPS systems, performance slightly better than the GPS limit at lower frequencies has been suggested, near 0.01 Hz. However, this is merely an artifact of actual GPS performance slightly exceeding modeled theoretical limits on several surveys.

The system and method of the present disclosure does not rely on inertial reference data to remove kinematic motion sensed by the gravimeter at relatively higher frequencies. Thus, curve 104 or the kinematic acceleration compensation limit does not apply. By way of non-limiting example, the gravimeter system of the present disclosure serves to eliminate the need for inertial reference measurements in order to compensate for kinematic acceleration. Paired accelerometers whose outputs are subtracted provides common mode cancellation of kinematic accelerations. In principle, kinematic acceleration transmitted to an object due to a base disturbance is determined by its connection to that base. In contrast, the object's acceleration due to gravity is determined by its mass. Deliberately connecting two objects independently to a base located in a substantially common gravity field allows for distinguishing gravitational from kinematic accelerations. In certain embodiments, the gravimeter system of the present disclosure eliminates the need for inertial references in underwater systems. Inertial references, such as depth sensors and Doppler velocity logs may be used in underwater applications. Previously, limitations in these solutions have imposed a limit on the data quality achievable by the gravimeter, particularly at higher frequencies.

Figure 2A:
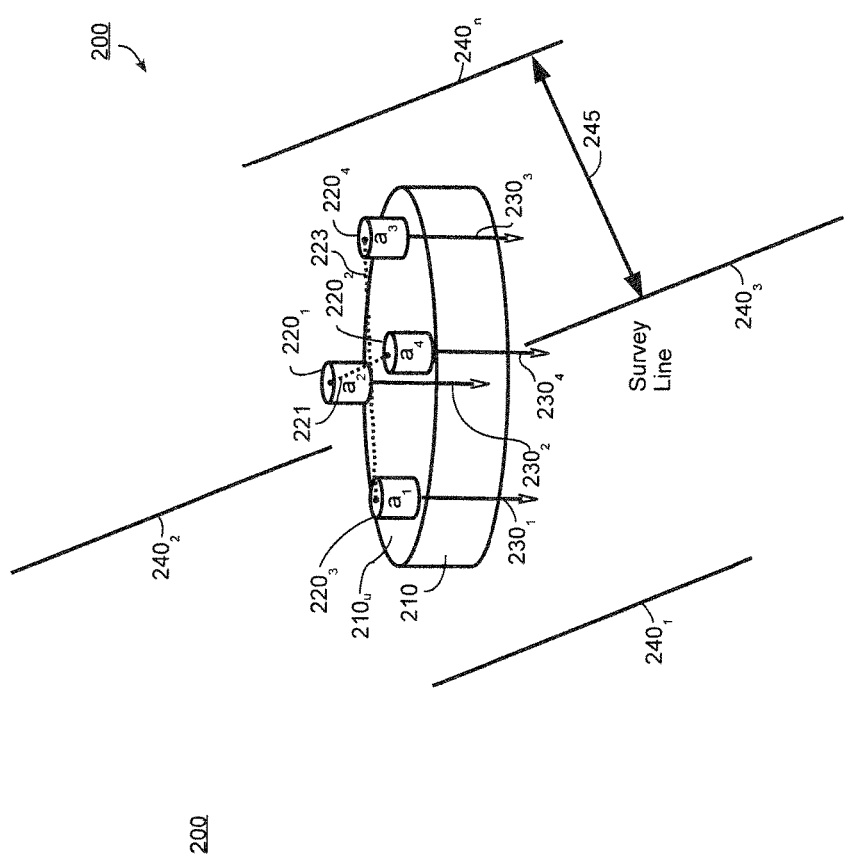
FIG. 2A is a perspective view of a gravimeter device for determining a gravitational field without use of an inertial reference according to an embodiment of the disclosure.
Figure 2B:
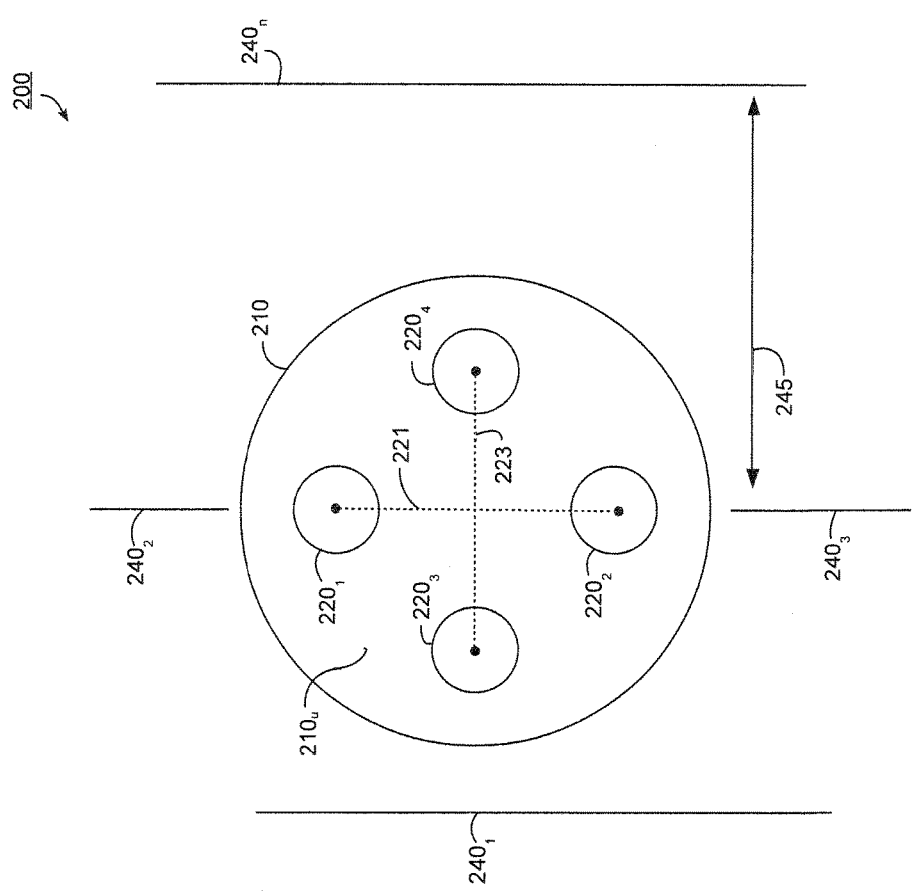
FIG. 2B is a plan view of the gravimeter device of FIG. 2A according to an embodiment of the disclosure.

Referring now to FIGS. 2A and 2B there are shown a perspective and plan view, respectively, of a gravimeter device according to an embodiment of the disclosure. The gravimeter device 200 includes a platform 210 having a planar upper surface $210_u$. A plurality of accelerometers 220 are attached to the platform 210 on the planar upper surface $210_u$. Each accelerometer 220 contains a proof mass which is influenced by forces due to accelerations affecting the accelerometer. The resulting movement of the proof mass is converted to an electronic signal representative of the sum total of the forces to which the accelerometer is subjected. The positioning of the proof mass within the housing of accelerometer 220 defines a sensitive axis of the accelerometer. When the accelerometer is positioned with its sensitive axis aligned with the direction of acceleration due to gravity, the accelerometer 220 is configured to produce an output signal representative of plumb gravity. The accelerometer output signal is transmitted via transmission lines included as part of the control circuitry in the accelerometer 220. The accelerometer transmission lines may be connected via external wiring to other circuitry components, including off accelerometer processors or memory for downstream processing.

The planar upper surface $210_u$, is configured to receive a plurality of accelerometers $220_1$, $220_2$, $220_3$, and $220_4$. While gravimeter device 200 of FIGS. 2A and 2B shows four accelerometers $220_1$-$200_4$, other numbers of accelerometers may be implemented. The accelerometers are arranged in pairs (e.g. $220_1$ and $220_2$; $220_3$ and $220_4$) to provide differential processing of the accelerometer output signals as explained in greater detail below. The platform 210 and attached accelerometers 220 are arranged within a host vehicle such that the sensitive axes of the accelerometers 220 are aligned with the direction of plumb gravity indicated by force vectors $230_1$, $230_2$, $230_3$, and $230_4$ in FIG. 2A.

Accelerometers 220 are arranged in pairs with each accelerometer in the accelerometer pair separated by a nominal distance defining a rectilinear baseline. For example, accelerometer $220_1$ and accelerometer $220_2$ are arranged on platform 210 defining a baseline 221 between accelerometer $220_1$ and accelerometer $220_2$. Accelerometer $220_3$ and accelerometer $220_4$ are arranged on platform 210 defining a baseline 223 between accelerometer $220_3$ and accelerometer $220_4$.

In operation, gravimeter device 200 is mounted in a host vehicle. The host vehicle is operated and carries the gravimeter device 200 while the host vehicle travels along a survey line 240. During surveys, many passes may be made over an area of interest, defining multiple survey lines $240_1$-$240_n$. Each survey line $240_1$-$240_n$ is substantially parallel to each other survey line 240. Accordingly, each survey line 240 is separated from a neighboring survey line 240 by some nominal distance 245. The type of survey being performed may determine the nominal distance 245. For example, in a regional survey, the nominal distance 245 between survey lines may exceed 500 meters. In a detailed survey, the nominal distance 245 may be maintained at less than 500 meters.

Gravimeter device 200 is attached to the host vehicle by a mounting device. The mounting device is configured to maintain the gravimeter device 200 at a trim level during transport. The platform 210 and attached accelerometers 220 are arranged relative to the host vehicle such that the rectilinear baseline 221 of at least one pair of accelerometers is arranged and maintained parallel to the survey line 240.

Referring to FIG. 2B, the accelerometer pair containing accelerometer $220_1$ and accelerometer $220_2$ defines rectilinear baseline 221. Baseline 221 is aligned with survey line $240_2$. As the host vehicle moves along survey line $240_2$, accelerometers $220_1$ and $220_2$ are subject to accelerations due to gravity as well as kinematic accelerations resulting from movement of the host vehicle. The accelerometers $220_1$, $220_2$ output signals that are representative of the sum total of forces created by accelerations experienced by the accelerometers $220_1$, $220_2$ including acceleration due to plumb gravity and other non-gravity components of acceleration. Due to the proximity of the accelerometers in the accelerometer pair and their common attachment to platform 210, each accelerometer 220 in the accelerometer pair operates in a substantially common gravity field via common platform 210. Similarly, since kinematic accelerations are applied to the accelerometers via their common connection to the platform 210, each accelerometer is exposed to a common source (e.g. the platform) of kinematic accelerations. Thus, the output of each accelerometer is a signal representative of the sum total of the common gravitational field and common kinematic accelerations experienced by both accelerometers in the pair. Each individual accelerometer additionally measures gravitational anomalies due to slight gravitational differences experienced by each of the paired accelerometers. These anomalies are included in the accelerometer's output signal. The gravity anomalies result due to environmental effects affecting gravity at the positions of the two accelerometers. The signals of each accelerometer in the pair may be subtracted from one another so that the common plumb gravity components and the common kinematic acceleration components are common-mode rejected out of the resulting subtracted value. What remains after the common plumb gravity and common kinematic forces are removed is the difference in the gravitational anomalies attributable to the difference in the Earth's gravitational fields at each accelerometer's location in the accelerometer pair. Subtracting the output signals compensates for errors due to kinematic accelerations irrespective of the frequency at which the kinematic accelerations occur. The limitations of prior art inertial reference compensation techniques due to their inability to detect accelerations occurring at frequencies above the inertial reference compensation limit is therefore substantially reduced or eliminated.

Still referring to FIGS. 2A and 2B, the host vehicle (not shown) carrying gravimeter device 200 travels along survey line 240. As the host vehicle travels along the survey line, accelerometer pair $220_1$, $220_2$ is subjected to forces due to accelerations applied by gravity and by non-gravity accelerations, for example kinematic accelerations resulting from movement of the host vehicle. Accelerometers $220_1$ $220_2$ each produce an output signal representative of the sum total of the accelerations experienced by the accelerometer. The output signals are transmitted to a processing device which receives and processes the signals to generate a compensated output. In one embodiment the processing device performs arithmetic operation (subtraction) on the signals from each accelerometer in the accelerometer pair resulting in a signal representative of a gravity anomaly gradient measured across the baseline distance between the paired accelerometers. The gravity anomaly gradient essentially contains only the difference between gravitational anomalies measured at locations of each accelerometer in the accelerometer pair. Each accelerometer location is separated from the other accelerometer spatially by baseline distance 221. The determined difference in gravitational anomalies measured at each accelerometer location is divided by the rectilinear baseline distance to calculate a horizontal or forward-down gravity gradient. The horizontal-down gravity gradient may be determined at points along the length of the survey line 240 and used by the processor to generate a value representing a horizontal-down gravity gradient measurement at points along the survey line 240.

A direct plumb gravity measurement is determined by taking the first and second accelerometer outputs and performing error correction to generate compensated accelerometer outputs. These error compensated output pairs are further processed (e.g. averaged) to generate a direct plumb gravity measurement representative of the overall plumb gravity experienced by the gravimeter device.

The generated horizontal-down gradient may be fused or combined with the direct plumb gravity measurement in order to obtain an enhanced or optimized direct plumb gravity measurement which thereby is compensated for accelerations due to non-gravity components of acceleration which appear as noise in the accelerometer output signal.

In one embodiment, a compensated plumb gravity measurement of each accelerometer 220 positioned on base platform 210 may be taken by adjusting the output signals of the accelerometers to remove identifiable non-gravity components of the output signals. The adjusted signals may be averaged to provide an overall direct plumb gravity measurement. The horizontal-down gravity gradient component may then be fused or combined with the direct plumb gravity measurement to provide an enhanced overall plumb gravity measurement at each point along the survey line 240. The enhanced plumb gravity measurement is compensated for identifiable and non-identifiable components of accelerations present in the accelerometer output signals. Still referring to FIGS. 2A and 2B, a second pair of accelerometers 220₃, 220₄ may be positioned such that the rectilinear baseline 223 defined by the pair of accelerometers 220₃, 220₄ is orthogonal to the rectilinear baseline 221 defined by accelerometers 220₁, 220₂. Each accelerometer 220₃, 220₄ outputs a signal used to calculate the gravity anomaly gradient across baseline 223. It is to be understood that accelerometers 220₁ and 220₂ measure the horizontal-down gravity gradient along the survey line (i.e. a forward-down gravity gradient), while accelerometers 220₃ and 220₄ measure the horizontal-down gravity gradient orthogonal to the survey line (i.e. a cross-track-down gravity gradient). The forward-down gravity gradients may be considered along with the calculated cross-track-down gravity gradients and fused or combined with a direct plumb gravity measurement to provide an enhanced plumb gravity product that has better correction than traditional inertial reference corrections. Additionally, the enhanced plumb gravity data is obtained without the need for an inertial reference because the kinematic accelerations included in the accelerometer output signals are removed when the output signals of the accelerometers in an accelerometer pair are subtracted from one another. Without the need for an inertial reference, calculating the enhanced plumb gravity data is not subject to the limitations imposed by the inertial reference measuring device.

As explained above, the gravimeter 200 of FIGS. 2A and 2B measures two types of plumb gravity. The first type is called direct plumb gravity and is measured along the sensitive axis of each accelerometer. The second type of plumb gravity is the horizontal-down gravity gradient for each point along the survey line 240. The horizontal-down gravity gradient is measured as the difference in plumb gravity between accelerometers arranged in an accelerometer pair along a baseline that is aligned with respect to the survey line 240. The two plumb gravity measurement types may be fused or combined to provide enhanced scalar gravity data which includes corrections for noise sources associated with shorter than typical wavelengths (e.g. higher frequencies) using the forward-down gradient measurements (e.g. along the survey line). These corrections were unavailable in conventional compensation techniques due to the inertial reference or GPS limit described above with regard to FIG. 1. Enhanced determination of gravity measurements between survey lines may be further provided by the lateral cross-track-down gravity gradient measurements (e.g. orthogonal to the survey line) which provide information relating to the difference in cross-track-down gravity anomalies between adjacent parallel survey lines. The cross-track-down gravity gradients may be calculated at corresponding points on adjacent survey paths and used to estimate the plumb gravity at points between the adjacent survey paths.

Figure 2C:
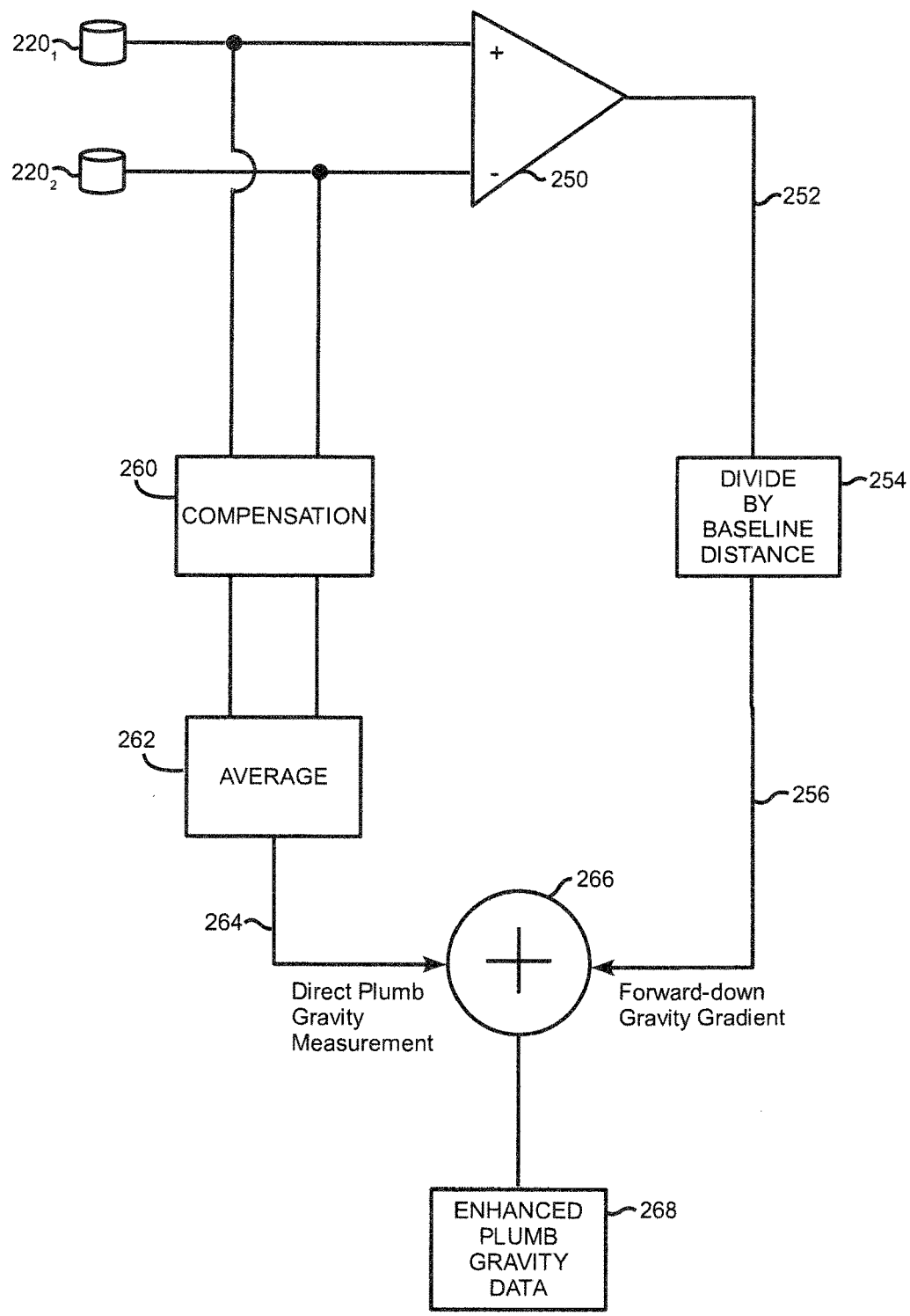
FIG. 2C is a functional block diagram for determining an enhanced plumb gravity measurement along a survey line according to an embodiment of the present disclosure.
Figure 2D:
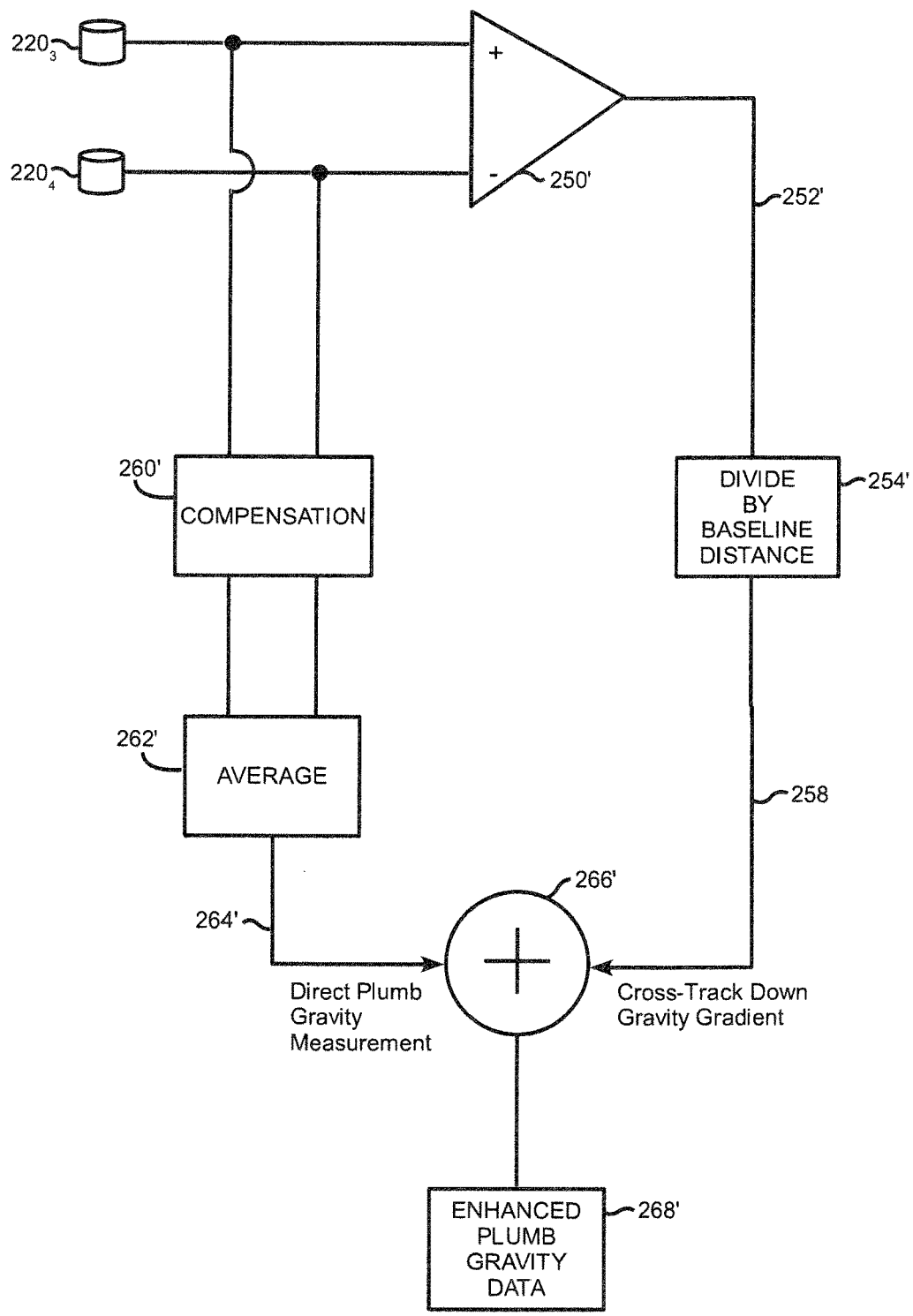
FIG. 2D is a functional block diagram for determining an enhanced plumb gravity measurement orthogonal to a survey line according to an embodiment of the present disclosure.

Referring now to FIGS. 2C and 2D (in conjunction with FIGS. 2A and 2B), the fusing of the direct plumb gravity measurement 264 with horizontal-down gravity gradient 256 measured between accelerometers in an accelerometer pair will now be described. A first gravity measurand or observable (denoted $G^{(1)}(f)$ in Equation (1)) represents the averaged 262 output of the two accelerometers compensated 260 for kinematic acceleration and other typical operational and/or accelerator error mechanisms. As discussed hereinabove, compensation for kinematic acceleration loses its integrity as frequency increases. Accordingly, the compensated gravity output $G^{(1)}(f)$ (e.g. direct plumb gravity measurement 264) contains unidentifiable non-gravity components which contribute noise to the gravity measurement due to these limitations. The output $G^{(1)}(f)$ is described spectrally according to Equation (1):

$$G^{(1)}(f)=G(f)+V_a(f)+V\upsilon(f) \qquad \text{Equation (1)}$$

where:
- $G(f)$ is the actual but unknown gravity anomaly along the survey path (the result sought by the survey);
- $V_a(f)$ is the remaining or residual kinematic acceleration, i.e. that portion which is not removed by applied compensation or possible erroneous compensation added by the overall compensation process; and
- $V\upsilon(f)$ is the conglomeration of remaining errors attributable to specific accelerometer higher-order effects, signal conditioning electronics conditioning noise, slight misalignments of the platform under motion, and the like.

A second gravity measurand or observable, (denoted $G^{(2)}(f)$ in Equation (2)), represents the horizontal or forward-down gravity gradient 256 obtained by differencing 250 the outputs of two accelerometers 220₁, 220₂ in an associated accelerometer pair along a baseline running parallel to the survey line and then dividing 254 by the separation distance between them. The computed output 256 ($G^{(2)}(f)$) is described according to:

$$G^{(2)}(f)=H(f)G(f)+V_g(f) \qquad \text{Equation (2)}$$

where:
- $G(f)$ is the actual but unknown gravity anomaly along the survey path (the result sought by the survey);
- $H(f)$ is a forward spatial differentiation operator (e.g. the product $H(f)G(f)$ is the forward-down gradient); and
- $V_g(f)$ is the residual gradiometer error (e.g. after any typical compensations are applied for effects attributable to specific error mechanisms on the gradient output.

The direct plumb gravity measurement 264 and forward-down gradient 256 observables given by Equations 1 and 2 above are linearly combined 266 using determinable frequency-dependent coefficients or weighting factors (denoted $A_1(f)$ and $A_2(f)$) to form a processed or blended observable (Ĝ(f)) according to:

$$\hat{G}(f) = A_1(f)G^{(1)}(f) + A_2(f)G^{(2)}(f) \quad \text{Equation (3)}$$

Weighting factors $A_1$ and $A_2$ may be applied to the direct plum gravity measurement 264 ($G^{(1)}$) and the horizontal-down gravity gradient 256 measurement ($G^{(2)}$), respectively. Weighting factors $A_1$ and $A_2$ are frequency dependent. For example, at relatively low frequencies, where kinematic compensation provides reliable error correction, weighting factor $A_1$ may be configured to asymptotically approach unity as the frequency of the error signals decreases. Similarly, at relatively high frequencies, where compensation techniques for kinematic accelerations are less reliable, weighting factor $A_2$ may be configured to asymptotically approach unity as the frequency of the error signals increase. Increasing weighting factor $A_2$ produces an enhanced plumb gravity measurement 268 that is increasingly influenced by the measurand associated with the horizontal-down gravity gradient measurement and has reduced influence from the direct plum gravity measurement. At intermediate frequencies weighting factors $A_1$ and $A_2$ may be configured to provide blending of the direct plumb gravity measurement 264 and the horizontal-down gravity gradient 256 measurement. The intermediate frequency band defines a cross-over region where blending of the direct plumb gravity measurement 264 and horizontal-down gravity gradient 256 occurs. A cross-over point exists where weighting factors $A_1$ and $A_2$ apply substantially equal weight to the direct plumb gravity measurement and the horizontal-down gravity gradient measurement. As weighting factor $A_1$ approaches unity at lower frequencies to increase the influence of the first measurand (e.g. direct plumb gravity measurement) and weighting factor $A_2$ approaches unity at higher frequencies approaching the inertial reference limit to increase the influence the second measurand (e.g. horizontal-down gravity gradient measurement), the resulting blended measurement value provides an improved or enhanced measure of plumb gravity across the spectral region of interest.

FIG. 2D shows an analogous process for the accelerometer pair $220_3$, $220_4$ to provide a cross-track-down gravity gradient 258. The cross-track-down gravity gradient 258 may be used to infer gravity measurements at points between parallel survey lines 240. Where the processing steps between FIGS. 2C and 2D are analogous, the elements in FIG. 2D are denoted with similar reference numerals denoted as "prime". For example, the output signal from accelerometer $220_4$ is subtracted 250' from the output signal of accelerometer $220_3$ according to the process shown in FIG. 2D.

The enhanced plumb gravity data 268 generated from the direct plumb gravity measurement 264 and the forward-down gravity gradient 256 in FIG. 2C, produces a plumb gravity measurement including short wavelength information for gravity measurements along the travel path of the host vehicle. Similarly, the enhanced plumb gravity data 268' generated from the direct plumb gravity measurement 264' and the cross-track-down gravity gradient 258 shown in FIG. 2D provides enhanced plumb gravity information which may be used to infill gravity measurements representative of points or locations that fall between adjacent survey lines. By considering corresponding points along adjacent survey lines and using the computed enhanced gravity data at the corresponding points along with prior geographic knowledge of the region of interest, gravity measurements for location points falling between the adjacent survey lines may be estimated. The estimated gravity measurements benefit from the fact that the cross-track-down gradient information contained in the enhanced plumb gravity product includes information relating to the short wavelength information contained in the accelerometer output signals.

To this end, the difference between the blended observable and the actual but unknown plumb gravity is defined, (denoted by symbol $\tilde{G}$) according to:

$$\tilde{G}(f) = \hat{G}(f) - G(f) = A_1(f)G^{(1)}(f) + A_2(f)G^{(2)}(f) - G(f) \quad \text{Equation (4)}$$

It should be noted that by definition, if this difference is zero, then the blended observable equals the sought plumb gravity measurement. The observables calculated in Equation 1 and Equation 2 may be rearranged such that the difference between the blended observable and the actual unknown plumb gravity may be determined according to:

$$\tilde{G}(f) = (A_1(f) + A_2(f)H(f) - 1)G(f) + A_1(f)(V_a(f) + V_v(f)) + A_2(f)V_g(f) \quad \text{Equation (5)}$$

Rough spectral characterization of the plumb gravity anomaly, G, for an area of interest is typically readily available. For example, gravity anomaly maps are available from the U.S. Geological Survey, or gravity anomaly maps provided by the Gravity Recovery and Climate Experiment (GRACE) conducted by NASA may be consulted. Spectral characterization of residual kinematic accelerations (e.g. errors in the GPS-derived accelerations) is well-known. Spectral characterization of residual gravity and gradient instrument errors is available per the instrument manufacturer's analyses and factory acceptance test data which are available from the manufacturer. According to these characterizations, coefficients $A_1(f)$ and $A_2(f)$ are generated by computing and minimizing the magnitude of the difference given by Equation (5) over the full spectral range in which the plumb gravity is sought. Once $A_1(f)$ and $A_2(f)$ are known they are used to filter the two observables to yield the blended data according to Equation (3). These coefficients roll off, (i.e., decrease in value), at high and low frequencies, respectively. The precise spectral profile of each coefficient and their crossover in the mid-frequency range depend on characterizations input to determine the coefficients.

The enhanced gravity data obtained by combining the direct plumb gravity measurement with either the forward-down gravity gradient (FIG. 2C) or the cross-track-down gravity gradient (FIG. 2D), represents a high-resolution scalar gravity measurement that may be used to produce accurate maps of the gravitational field in the region of interest (e.g. in or about the surveyed region). The enhanced gravity data takes into account the short wavelength information that is missing in data provided by conventional compensation techniques using an inertial reference. The enhanced gravity measurements may be used as inputs to a processor to generate models of the gravitational field through techniques such as geophysical inversion.

Geophysical inversion is the estimation of physical properties in the area of interest based on observed or measured data. For geophysical inversion, an initial model based on basic prior knowledge of the region is constructed. Based on the initial model, a computer processor generates predicted data is generated representative of measurements that would be expected in the region of interest based on the initial model. The actual measured data is then compared to the predicted data and a similarity function is performed to determine how close the measured data comes to the predicted data. While the predicted data differs from the measured data by some quantitative threshold, the model is revised and updated and new predicted data is generated. The comparison of the predicted data to the measured data and the updating of the model is iteratively repeated until the comparison indicates the similarity between the measured data and the predicted data from the updated model falls below the threshold. Using the enhanced gravity data described herein, the resulting models are more accurate and provide higher resolution than previously available data due to the recognition of shorter wavelength signal information produced in the accelerometer output signals.

The accelerometers providing the measurements above perform optimally assuming the accelerometers and the supporting assembly are maintained level throughout the survey. According to an embodiment, a mounting apparatus is provided for maintaining the accelerators at trim level throughout a survey.

Figure 3:
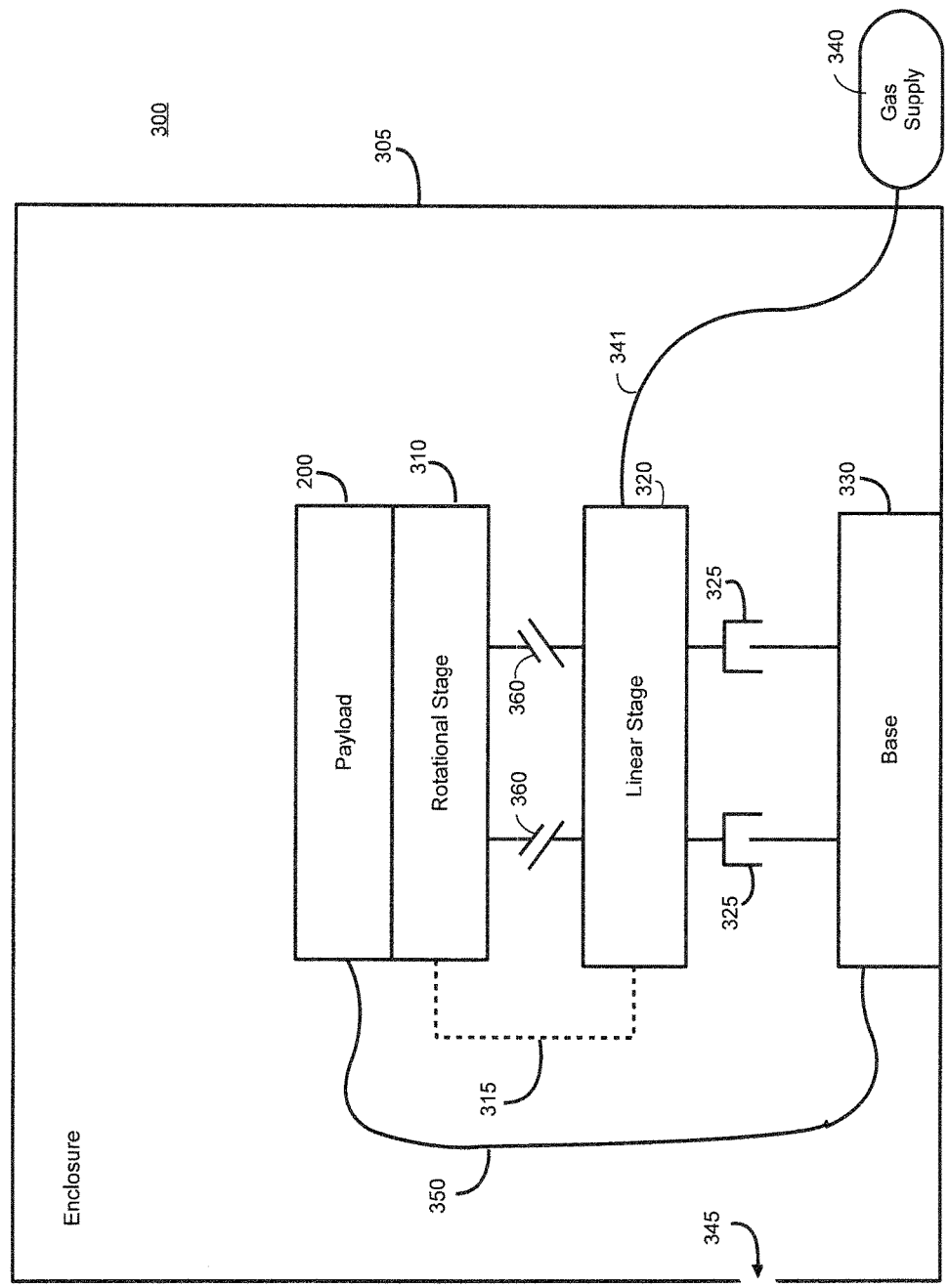
FIG. 3 is a block diagram of a gravimeter and mounting system for use in a host vehicle according to an embodiment of the present disclosure.

FIG. 3 is block diagram of a mounting apparatus 300 for mounting the gravimeter device of FIG. 2 to a survey vehicle. Host vehicles carrying gravimeter instruments during a survey exhibit translational motion disturbances that can be accommodated by a suspension apparatus such as the apparatus 300 shown in FIG. 3.

The mounting apparatus 300 includes a base 330 which is fixedly attached to a host vehicle (not shown). The mounting apparatus includes a stationary linear stage 320 which supports a rotational stage 310. The linear stage 320 includes base 330 and isolates the linear stage 320 from movement of the base 330 through passive isolation interface 325. For example, viscous air springs may be used to provide isolation from disturbances such as vibration transmitted from the host vehicle. This prevents the disturbances from affecting the rotational stage 310 which supports the gravimeter device and its associated accelerometers.

The rotational stage 310 provides a rotational interface with the linear stage 320. The rotational interface provides rotational freedom relative to the linear stage 320. The linear stage 320 is substantially fixed with respect to the instruments hosted as part of payload 200. The payload 200 is moveable by virtue of its coupling to rotational stage 310. Payload 200 as shown in the embodiment of FIG. 3 is a representation of the disk-like platform 210 and accelerometers 220 shown in FIG. 2, by way of example. Payload 200 is rigidly attached to rotational stage 310 and may be maintained level with respect to the Earth by adjusting the position of the rotational stage 310 with respect to the host vehicle via the linear stage 320. Instruments contained in payload 200 may receive and transmit power and data signals via an umbilical communications link 350 to base 330. Power and control data information may be transmitted from controllers (not shown) outside of apparatus 300 and transmitted via umbilical link 350 to instruments in payload 200. Controllers may include computers and related processors. One or more processors may be configured to receive executable instructions from a memory. The one or more processors execute the instructions to process data and generate signals relating to measuring gravitational fields in a gravimeter without an inertial reference. Likewise, instruments in payload 200 may include sensors and related circuitry which sense a measured quantity, such as gravity or acceleration, and produce signals indicative of the sensed quantity. The produced signals are communicated via umbilical link 350 through base 330 attached to the host vehicle. From base 330, the signals may be communicated through communication paths, such as communication interfaces or communication buses. The communication interfaces or buses may be in communication with processors which receive the signals and execute instructions for processing the data contained in the signals.

The interface between the rotational stage 310 and the linear stage 320 may be provided as a non-contacting bearing 360. Implementation of a non-contacting bearing 360 reduces friction and further isolates the rotational stage 310 from possible errors introduced from the operation of the host vehicle. According to an embodiment, the non-contacting bearing may be implemented as a spherical air bearing as described in greater detail below with respect to FIGS. 4 and 5. A mechanical brake or coupling 315 may be provided to fix the position of the rotational stage 310 to the linear stage 320. In one embodiment, a compressed gas supply 340 is coupled to the linear stage 320 via pneumatic line 341. This provides the linear stage 320 with a supply of gas under pressure. The gas may be air or another suitable gas sufficient to provide a gas cushion which supports the rotational stage 310 in a non-contacting manner. The payload 200, rotational stage 310, linear stage 320 and base 330 may be housed in an enclosure 305 which isolates the assembly from further outside interferences. The enclosure 305 may have a vent 345 defined through a wall of the enclosure 305 for maintaining ambient pressure (e.g. atmospheric pressure or depth pressure) to the interior volume of enclosure 305.

Figure 4:
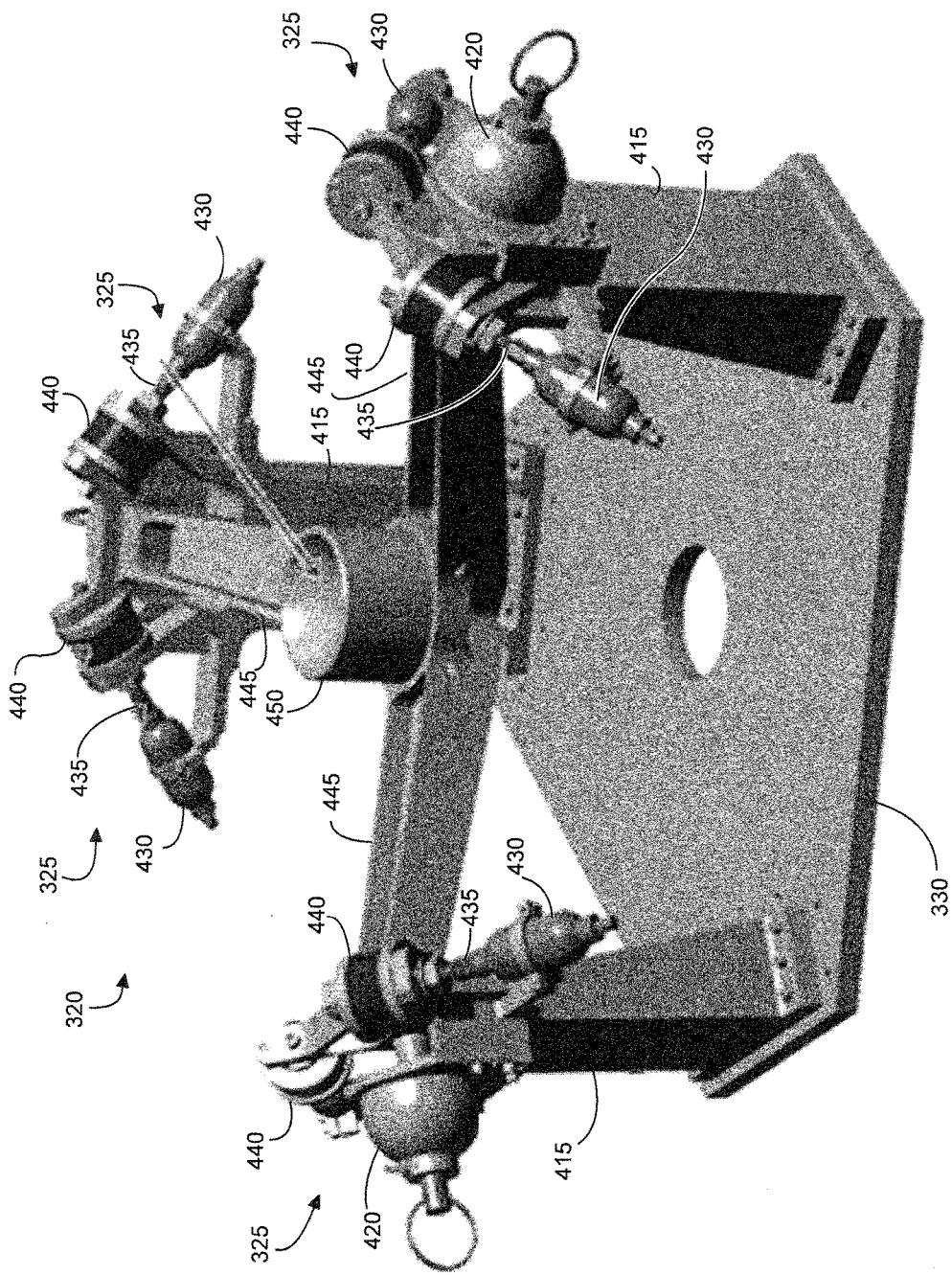
FIG. 4 is a perspective view of a linear stage of a mounting system for attachment to a host vehicle according to an embodiment of the present disclosure.

Referring now to FIG. 4, a perspective view of a linear stage 320 having a base 330 for attaching a gravimeter instrument to a host vehicle is shown. Base 330 is adapted to be fixedly attached to a host vehicle (not shown). By way of example, the host vehicle may be a small fixed wing aircraft or helicopter for airborne gravimeter surveys, or an autonomous underwater vehicle (AUV) for underwater or ocean bottom surveys. Base 330 includes a number of support members 415 which support a portion of the spherical air bearing supported by the linear stage 320 (FIG. 3). While three support members 415 are shown in FIG. 4, other numbers of support members 415 may be used. Each support member 415 is coupled to base 330 and supports a passive isolation interface 325 that provides an adjustable suspension between the gravimeter instrument mounted on the spherical air bearing and the host vehicle. According to the embodiment shown in FIG. 4, interface 325 comprises an auxiliary air chamber 430 which is connected to an air spring 440 via a coupler which includes an adjustable orifice 435.

The linear stage 320 is coupled to the air springs 440 by arm members 445 which extend from passive isolation interfaces 325 and air springs 440 to a central point where the arm members 445 converge to support a spherical cup 450 embodying a lower half of the spherical air bearing. A source of gas under pressure (340, shown in FIG. 3) is provided to apertures extending through the concave surface defined by the spherical cup 450.

Base 330 may be fixedly attached (e.g., bolted) to the cabin floor or frame of a host vehicle or survey platform. Mounting base 330 extends upward via support members 415 which support the linear stage 320 via air springs 440. By way of non-limiting example, helical coil springs or viscoelastic dampers may also be used to provide a passive suspension system. In an embodiment, triaxial accelerometers (not shown) are affixed to the linear stage 320. Active suspension components in the form of mechanical actuators (e.g. stingers) cancel specific, discrete, tonal disturbances that would otherwise be transmitted through the mounting base 330 and springs 440 to the linear stage 320.

The linear stage 320 contains a spherical cup 450 that defines the lower half of the spherical air bearing. The spherical cup 450 supports the upper half of the air bearing, comprising the spherical bearing of the rotational stage which contains a spherical surface which mates with the concave spherical surface of the spherical cup 450. The upper half of the spherical air bearing is supported in a non-contacting manner atop the spherical cup 450 by a thin cushion of air. The air is provided as pressurized air introduced to the concave surface of the spherical cup 450 through apertures 460 (shown in FIG. 5) These apertures provide a passage through the cross sectional extent of the concave surface of spherical cup 450. The upper half of the spherical air bearing includes a convex spherical portion that engages the spherical cup 45. The convex spherical portion defines part of a first theoretical sphere whose surface includes the convex surface of the spherical portion of the upper half of the spherical air bearing. Spherical cup 450, likewise has a concave spherical portion that defines a second theoretical sphere whose surface includes the concave surface of the spherical cup 450. The first theoretical sphere corresponding to the upper half of the spherical bearing is arranged to be concentric with the second theoretical sphere corresponding the lower half of the spherical bearing (e.g. spherical cup 450) when the upper half of the spherical air bearing engages with the lower half of the bearing. Accordingly, the instrument and platform comprise a symmetric and concentric arrangement wherein the linear stage 320, rotational stage, inertial sensors, actuators, enclosure and passive suspension components share a common center of mass, stiffness, loading and bearing rotation. The gravity measured by the gravimeter instrument is calculated from this common center point. In an embodiment, linear stage 320 may include calibration lasers or other sensors used to determine the relative position and/or alignment of the rotational stage 310 to the linear stage 320.

The rotational stage of the spherical air bearing may be rotated about the common center point with little or no friction due to the fact that the rotational stage is supported on a thin cushion of air without physically contacting the spherical cup 450. The spherical air bearing thereby provides three axes of limited, but sufficient rotation to the rotational stage. This replaces conventional solutions using a series of nested gimbals and associated bearings and races, flex capsules and slip rings which introduce additional disturbance signals due to their physical contact between the mount and the gravimeter instruments.

In operation, linear stage 320 includes base 330 which is rigidly attached to the host vehicle (not shown, such as an aircraft or UAV). Rotational stage 310 is positioned such that the spherical bearing member 510 associated with the rotational stage 310 is engaged in spherical cup 450 associated with linear stage 320. Air or other suitable gas or fluid is introduced between the spherical bearing member 510 and the spherical cup 450 to provide a thin cushion that supports the spherical bearing member 510 and rotational stage 310 while decoupling the rotational stage 310 from the linear stage 320 and base 330.

Figure 5:
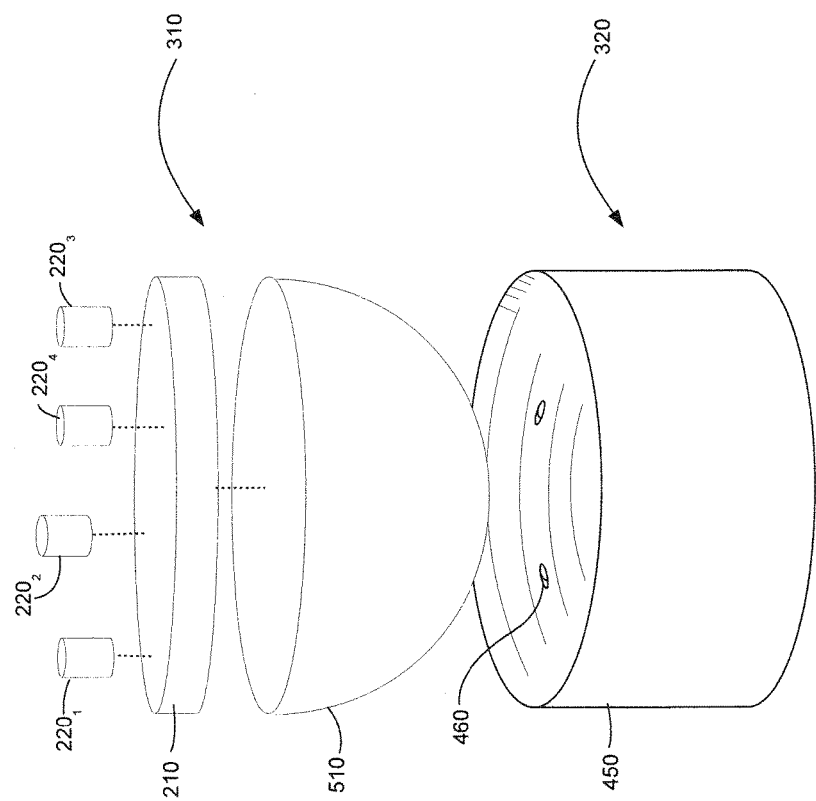
FIG. 5 is a perspective exploded view of a spherical air bearing and gravimeter device according to an embodiment of the present disclosure.

FIG. 5 is a perspective, partially exploded view of a spherical air bearing supporting the gravimeter instrument of FIG. 2. According to the non-limiting embodiment shown in FIG. 5, the rotational stage 310 is defined by a substantially disk-like platform 210 supporting accelerometers indicated generally as 220. Additional circuitry or components including inertial components such as gyroscopes and/or magnetohydrodynamic sensors (MHDs) used for leveling and orienting the rotational stage 310 may also be housed thereon. Other supporting electronics, for example, processors which process the outputs of accelerometers 220 output signals, power data storage and actuators may also be included as part of rotational stage 310. These additional electronics may be disposed on disk-like platform 210. A central, substantially spherical bearing member 510 defines the rotational stage's center of mass. The spherical bearing 510 provides structural support for the disk-like platform 210.

Spherical bearing 510 is coupled to a plurality of spherical actuators (not shown). Spherical actuators provide rotational adjustment of rotational stage 310 relative to the linear stage 320. The spherical actuators actively align or orient the rotational stage 301 to a desired (e.g. target) survey frame and are positioned physically or functionally between the linear stage and rotational stage 310. According to one embodiment of the disclosure, alignment between the rotational stage 310 and the linear stage 320 may be provided in conjunction with spherical actuators by configuring one or more calibration lasers (not shown) coupled to the linear stage 320. The calibration lasers are configured and aligned so as to project a light beam onto one or more reflectors attached to the rotational stage 310. The calibration lasers may include a receptor (e.g. photo detector) configured to receive the reflected light beam. A processor operatively coupled thereto receives signals from the calibration laser 503 and determines the relative alignment between the rotational stage 310 and the linear stage 320. Alignment between the rotational stage 310 and the linear stage 320 may then be adjusted by the processor by transmitting a signal to the spherical actuators to adjust the alignment of the rotational stage 310.

Figure 6:
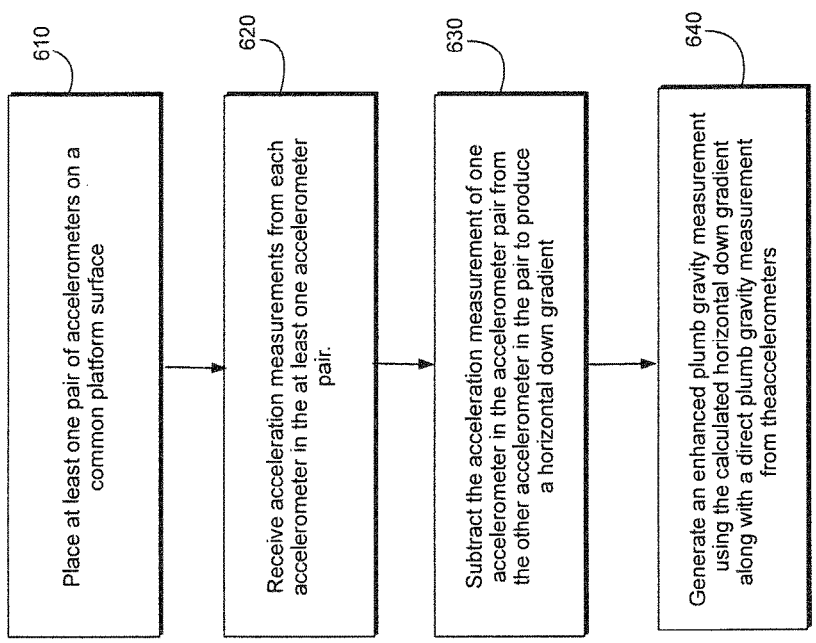
FIG. 6 is a process flow for measuring a gravitational field without using an inertial reference according to an embodiment of the present disclosure.

FIG. 6 is a block diagram of a method for measuring a gravitational field using a gravimeter device without the use of an inertial reference device. At block 610, at least one pair of accelerometers are placed on a common platform surface. Each accelerometer in the at least one accelerometer pair is displaced from the other accelerometer in the pair by a nominal distance that defines a baseline between the accelerometers. In operation, the gravimeter device may be oriented with respect to a survey line or path, wherein the baseline between the accelerometers is aligned with the survey line. The at least one pair of accelerometers are subjected to forces due to the sum total of accelerations applied to the accelerometers during the survey. The output of each accelerometer is a measurement of acceleration which includes components of direct plumb gravity and non-gravity components such as kinematic accelerations transferred to the accelerometer from the host vehicle through the base platform on which the gravimeter device is attached. The output signals from each accelerometer of the at least one pair of accelerometers is received by a processing device as shown in block 620. The processing device may be a general or special purpose computer including a processor and/or memory for receiving measurements of acceleration output from the accelerometers in the at least one accelerometer pair and calculating a horizontal down gravity gradient compensated for kinematic acceleration. The measure of acceleration of one of the accelerometers in the pair is subtracted from the acceleration measurement of the other accelerometer in the pair to produce a horizontal down gravity gradient as indicated by block 630. The calculated horizontal down gravity gradient is then fused with a direct plumb gravity reading of the accelerometers to produce an enhanced plumb gravity measurement 640 which is compensated for kinematic accelerations in the host vehicle without being subject to the frequency limits associated with inertial reference devices for providing estimates of kinematic acceleration.

Figure 7:
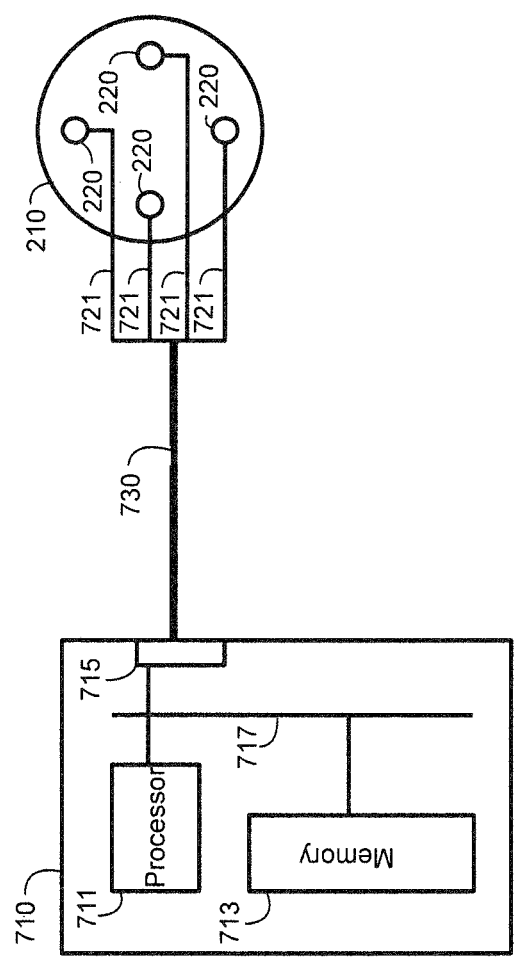
FIG. 7 is a computing system including a processor for receiving measurements from a number of accelerometers and for determining an enhanced or compensated gravity measurement without using an inertial reference according to an embodiment of the disclosure.

FIG. 7 is a block diagram of a computer system including a computer processor configured for determining a compensated gravity measurement without the use of an inertial reference according to an embodiment of the disclosure. Platform 210 has an upper surface which is depicted as circular in FIG. 7. At least one accelerometer 220 is placed on the upper surface of platform 210. By way of non-limiting example, accelerometers 220 may be provided and arranged in pairs whereby each pair of accelerometers 220 defines a baseline between each accelerometer 220 in each accelerometer pair. Each accelerometer 220 measures a specific force which includes acceleration components relating to acceleration due to gravity as well as kinematic acceleration due to accelerations relating to motion of the host vehicle. The information relating to the force measurement is carried from the accelerometer 220 by signal line 721. Signal lines 721 from all accelerometers 220 are in turn transmitted via cable 730 to computer 710. Computer 710 may be located on a surface of the platform 210, or may be located off-platform and connected to accelerometers 220 via cable 730, which may be configured as an umbilical cable.

Computer 710 includes a processor 711. Processor 711 is in communication with memory 713 and communication port 715 by communication bus 717. Computer 710 may receive information signals representative of force measurements captured by accelerometers 720 via communication cable 730. The force measurement values may be stored in memory 713 or communicated directly to processor 711. Processor 711 may be a general purpose computer processor which, when provided appropriate instructions, is configured to process the force measurement values and determine a compensated gravity measurement from platform 210. The force measurements from accelerometers 220 may be taken over the longitudinal distance of a survey line, or may be measured along a cross-track baseline. Compensated gravity measurements are calculated defining gravity gradients along the survey line which are fused with the direct plumb gravity acceleration components of the accelerometers 220 to provide an improved gravity measurement value compensated for kinematic accelerations of the host vehicle.

Memory 713 may store the accelerometer force measurement values received from accelerometers 220. The measurements may later be retrieved by processor 711 via communication bus 717 for processing. Memory 713 may also include software instructions which are executable by processor 711. The instructions may be retrieved from memory 713 and communicated to processor 711 via communications bus 717. The instructions are executed by processor 711 and cause the processor 711 to perform calculations which process the accelerometer 220 data. The processing includes compensation calculations which remove the kinematic acceleration components which are detected by accelerometers 220 as a result of the accelerations caused by motion of the host vehicle.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A system for measuring the gravitational field of the Earth without an inertial reference device comprising:
   a pair of accelerometers disposed on a platform, said pair of accelerometers arranged to measure plumb gravity along a sensitive axis aligned with gravity, the pair of accelerometers comprising a first accelerometer and a second accelerometer spatially separated from each other to define a first baseline having a first baseline distance, the first baseline being configured to be maintained parallel to a linear survey path;
   a computer processor in communication with each accelerometer, the computer processor including differencing circuitry, the computer processor being configured to, at each of a plurality of locations along the linear survey path as the platform continuously moves in a direction parallel to the linear survey path:
      receive a first output signal from the first accelerometer of the pair;
      receive a second output signal from the second accelerometer of the pair, wherein said first output signal said second output signal are representative of a sum total of all accelerations sensed by the associated first accelerometer and second accelerometer, respectively, including plumb gravity and other non-gravity components of acceleration;
      determine, by the differencing circuitry, a difference of said first output signal and said second output signal and integrate over the first baseline distance to calculate a forward-down gravity gradient;
      remove identifiable non-gravity components from the first output signal to generate a first compensated output signal;
      remove identifiable non-gravity components from the second output signal to generate a second compensated output signal;
      average said first compensated output signal and said second compensated output signal to generate a first direct plumb gravity measurement;
      generate a first enhanced plumb gravity data measurement based on said first direct plumb gravity measurement and said forward-down gravity gradient; and generate a model of a gravitational field that identifies the first enhanced plumb gravity data measurement at locations along the linear survey path; and wherein the system lacks an inertial reference device.

2. The system of claim 1, wherein said computer processor is further configured to:

apply a first weighting factor to said first direct plumb gravity measurement and a second weighting factor to said forward-down gravity gradient.

3. The system of claim 2, wherein said first and second weighting factors are determined based on a frequency of said non-gravity components of acceleration.

4. The system of claim 3, wherein said first weighting factor has greater influence than said second weighting factor when the frequency of said non-gravity components is less than about 0.01 Hz; and wherein said second weighting factor has more influence than said first weighting factor when the frequency of said non-gravity components is greater than about 0.01 Hz.

5. The system of claim 1, further comprising a mounting assembly for coupling said platform to a host vehicle, said mounting device comprising:

a base configured to be rigidly attached to the host vehicle;

a rotational bearing configured to be coupled to and support said platform, wherein said rotational bearing comprises:

a linear stage coupled to said base; and a rotational stage coupled to said platform.

6. The system of claim 5, wherein said linear stage comprises:

a spherical cup; and a source of fluid under pressure;

wherein said source of fluid under pressure is in fluid communication with at least one aperture defined in a concave surface of said spherical cup.

7. The system of claim 6, wherein said rotational stage comprises:

a spherical bearing member configured to engage with said spherical cup, said spherical bearing member configured to rest on and be supported by a cushion of fluid under pressure between said spherical cup and said spherical bearing member, said spherical bearing member being supported by said linear stage in a non-contacting manner.

8. The system of claim 5, further comprising:

a passive isolating suspension disposed between said base and said linear stage.

9. The system of claim 8, wherein said passive isolating suspension comprises an air spring coupled to an auxiliary air chamber via a conduit having an adjustable orifice.

10. The system of claim 8, wherein said passive isolating suspension comprises a helical spring.

11. The system of claim 5, wherein said host vehicle is configured as an autonomous underwater vehicle (AUV).

12. The system of claim 5, wherein said host vehicle is configured as an airborne platform.

13. The system of claim 12, wherein said airborne platform is a fixed wing aircraft.

14. The system of claim 1, further comprising:

a second pair of accelerometers comprising a third accelerometer and a fourth accelerometer spatially separated to define a second baseline having a second baseline distance, the second baseline being substantially orthogonal to said first baseline between the accelerometers of said pair of accelerometers.

15. The system of claim 14, wherein said processor is further configured to:

receive a third output signal from said third accelerometer;

receive a fourth output signal from said fourth accelerometer, wherein said third output signal and said fourth output signal are representative of a sum total of all accelerations sensed by the associated third accelerometer and fourth accelerometer, respectively, including plumb gravity and other non-gravity components of acceleration;

determine a difference of said third output signal and said fourth output signal and integrate over the second baseline distance to calculate a horizontal cross track-down gravity gradient;

remove identifiable non-gravity components from the third output signal to generate a third compensated output signal;

remove identifiable non-gravity components from the fourth output signal to generate a fourth compensated output signal;

third compensated output signal and said fourth compensated output signal to generate a second direct plumb gravity measurement;

generate a second enhanced plumb gravity measurement based on said second direct plumb gravity measurement and said horizontal cross track down-gravity gradient to calculate a final data gravity measurement.

16. In a gravimeter having a platform on which is disposed at least a pair of accelerometers spatially separated from each other to define a first baseline having a first baseline distance, a method for measuring the force due to gravity without using an inertial reference device comprising:

receiving, by a computer processor, at each of a plurality of locations along a linear survey path as the platform continuously moves in a direction parallel to the linear survey path, a first output signal from a first accelerometer of the pair of accelerometers and a second output signal from a second accelerometer of said pair of accelerometers that are representative of a sum total of all accelerations sensed by the associated first accelerometer and second accelerometer while being maintained parallel to the linear survey path, respectively, including plumb gravity and other non-gravity components of acceleration, the pair of accelerometers measuring plumb gravity along a sensitive axis aligned with gravity;

determining, by the computer processor, a difference of said first output signal and said second output signal and integrating over the first baseline distance to calculate a forward-down gravity gradient;

removing, by the computer processor, identifiable non-gravity components from the first output signal to generate a first compensated output signal;

removing, by the computer processor, identifiable non-gravity components from the second output signal to generate a second compensated output signal;

averaging, by the computer processor, said first compensated output signal and said second compensated output signal to generate a first direct plumb gravity measurement;

generating, by the computer processor, a first enhanced plumb gravity data measurement based on said first direct plumb gravity measurement and said forward-down gravity gradient; and generating, by the computer processor, a model of a gravitational field that identifies the first enhanced plumb gravity data measurement at locations along the linear survey path, the model being generated without the use of an inertial reference device.

17. The method of claim 16, wherein a second pair of accelerometers is disposed on said platform and spatially separated from each other to define a second baseline having a second distance, the second baseline being orthogonal to said first baseline, said method further comprising the steps of:

receiving a third output signal from a third accelerometer of said second pair of accelerometers;

receiving a fourth output signal from a fourth accelerometer of said second pair of accelerometers, wherein said third output signal and said fourth output signal are representative of a sum total of all accelerations sensed by each associated accelerometer of said second pair of accelerometers, respectively, including plumb gravity and other non-gravity components of acceleration;

determining a difference of said third output signal and said fourth output signal and integrating over the second baseline distance to calculate a horizontal cross track-down gravity gradient;

removing identifiable non-gravity components from the third output signal to generate a third compensated output signal;

removing identifiable non-gravity components from the fourth output signal to generate a fourth compensated output signal;

averaging said third compensated output signal and said fourth compensated output signal to generate a second direct plumb gravity measurement; and generating a second enhanced plumb gravity data measurement based on said second direct plumb gravity measurement and said horizontal cross track down-gravity gradient.

18. The method of claim 16, wherein the generating the first enhanced plumb gravity data measurement comprises:

applying a first weight to said first direct plumb gravity measurement; and applying a second weight to said forward-down gravity gradient measurement;

wherein said first and second weights are based on a frequency of the non-gravity accelerations.

19. The method of claim 17, further comprising:

defining a survey path and moving the first and second accelerometers in the pair of accelerometers along the survey path and maintaining the first baseline between the first and second accelerometers substantially parallel to the survey path.

* * * * *